Figure 1:
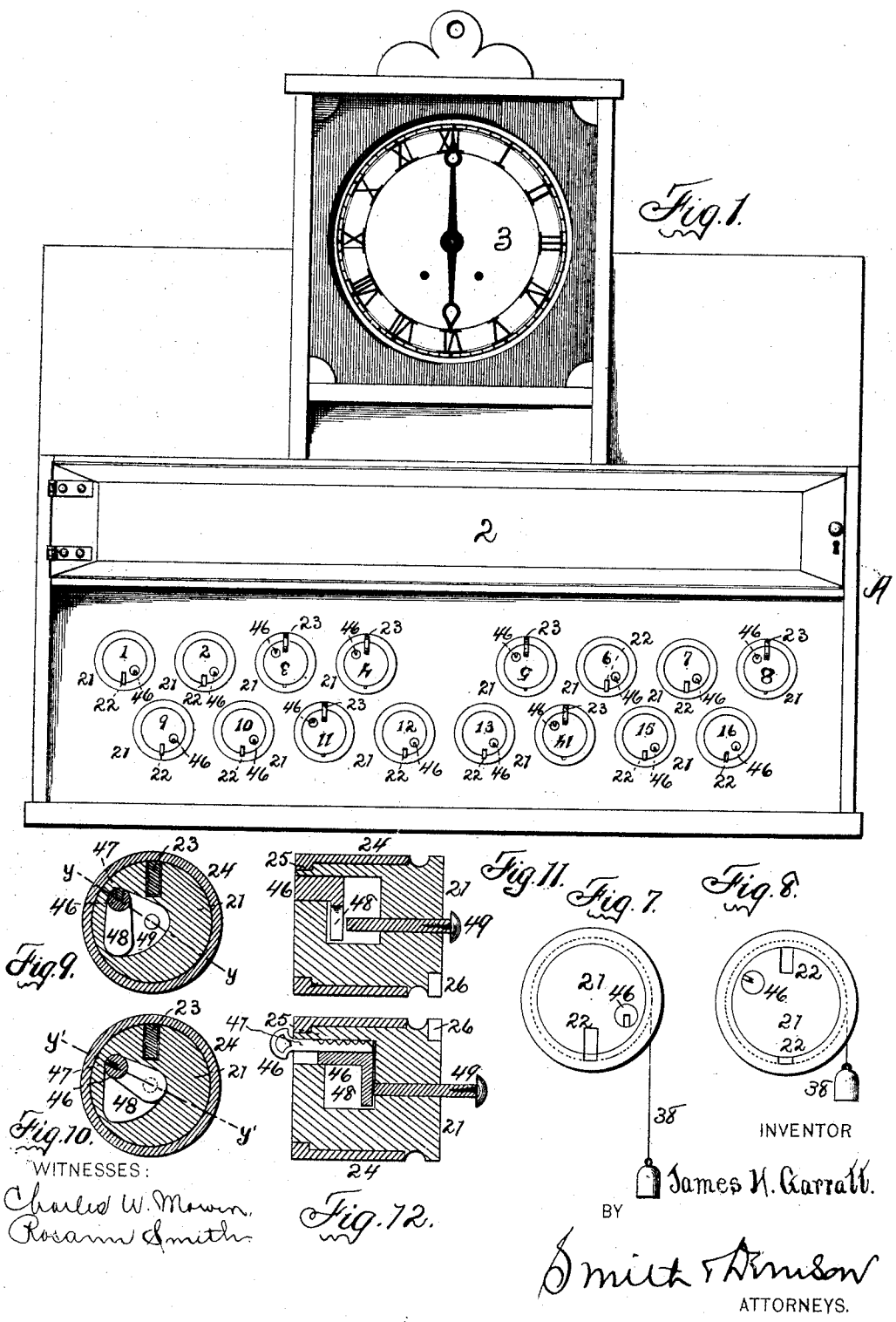

No. 620,906. Patented Mar. 14, 1899.
J. H. GARRATT.
WORKMAN'S TIME RECORDER.
(Application filed Dec. 23, 1897.)
(No Model.) 5 Sheets—Sheet 1.

INVENTOR
James H. Garratt.

No. 620,906. Patented Mar. 14, 1899.
J. H. GARRATT.
WORKMAN'S TIME RECORDER.
(Application filed Dec. 23, 1897.)
(No Model.) 5 Sheets—Sheet 2.

WITNESSES:
Charles W. Mowin.
Rosann Smith.

INVENTOR
James H. Garratt.
BY
Smith & Denison
ATTORNEYS.

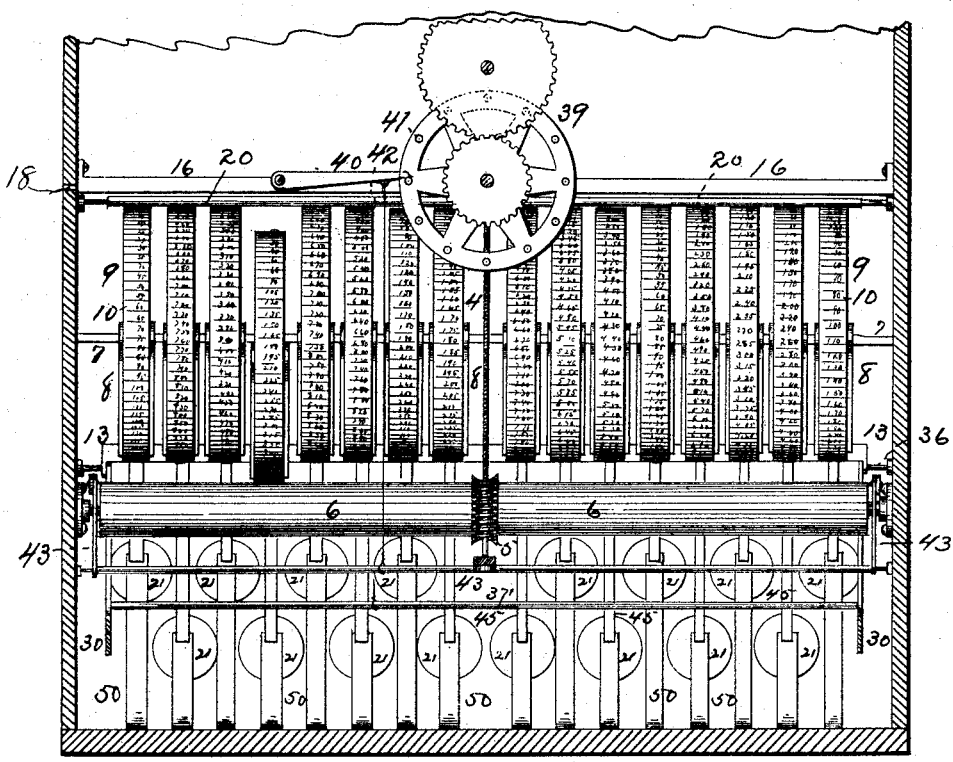

No. 620,906. Patented Mar. 14, 1899.
J. H. GARRATT.
WORKMAN'S TIME RECORDER.
(Application filed Dec. 23, 1897.)
(No Model.) 5 Sheets—Sheet 4.
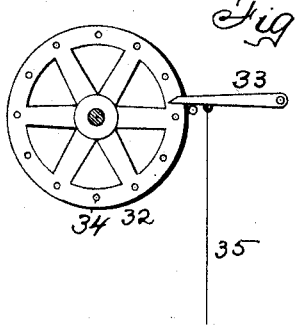
Fig. 13.
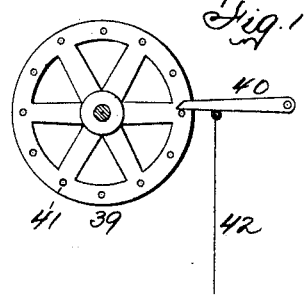
Fig. 14.
Fig. 15.
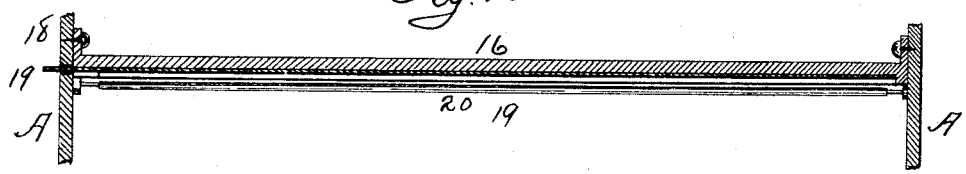
Fig. 16.
| a | 1 | 9 | 2 | 10 | 3 | 11 | 4 | 12 | | 13 | 5 | 14 | 6 | 15 | 7 | 16 | 8 | |
|---|---|---|---|---|---|---|---|---|---|---|---|---|---|---|---|---|---|---|
| b | 7½ | 13¼ | 15 | 16¼ | 17½ | 7½ | 18¾ | 20 | | 20 | 22½ | 25 | 25 | 30 | 32½ | 47½ | 50 | |
| Dec. 2 1897 | 450 | 795 | 780 | 975 | 1050 | 450 | 1125 | 900 | | 900 | 1339/1350 | 1500 | 1500 | 1800 | 1950 | 2850 | 3000 | Total $231.64 |
| | c | d | e | f | g | h | i | j | | k | m | n | o | p | r | s | t | |
19
Fig. 17.
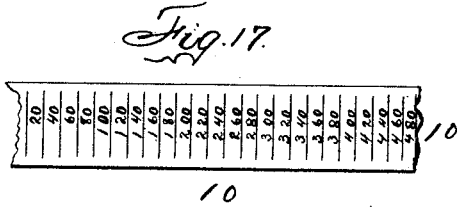
INVENTOR
James H. Garratt.
BY
Smith & Denison
ATTORNEYS.
WITNESSES:
Charles W. Marvin.
Rosann Smith.

No. 620,906. Patented Mar. 14, 1899.
J. H. GARRATT.
WORKMAN'S TIME RECORDER.
(Application filed Dec. 23, 1897.)
(No Model.) 5 Sheets—Sheet 5.
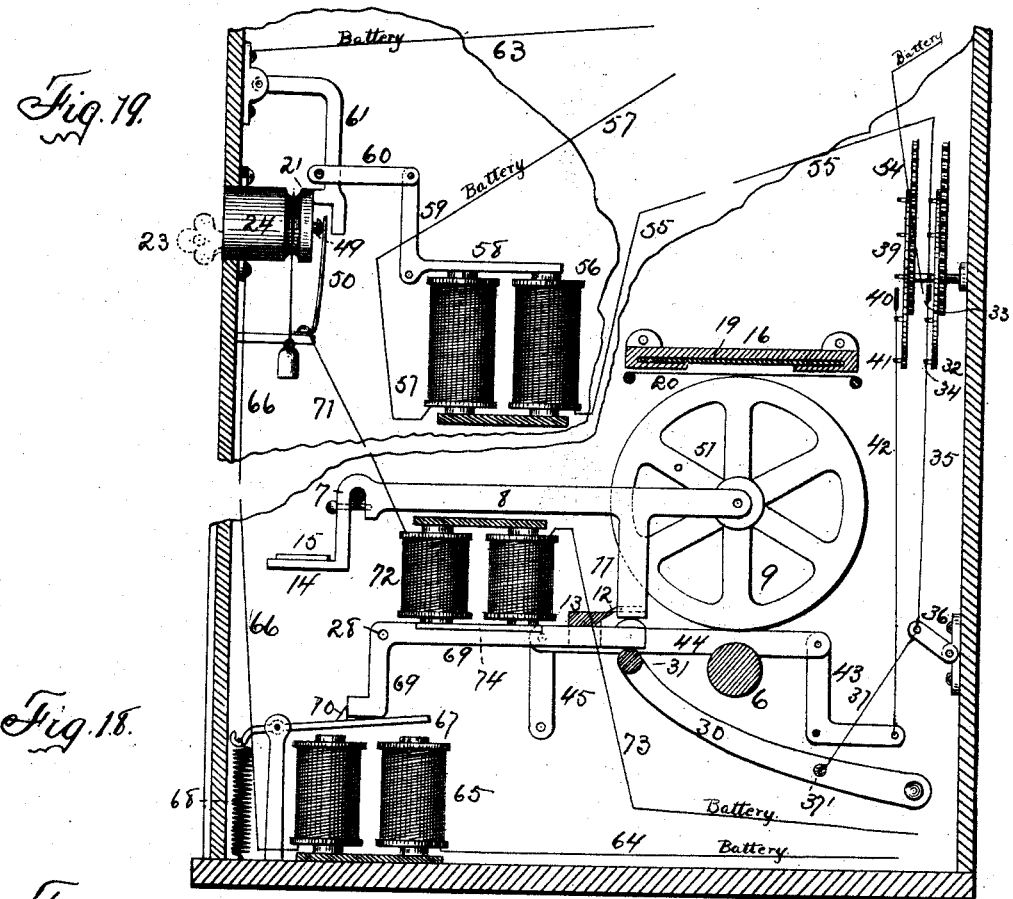
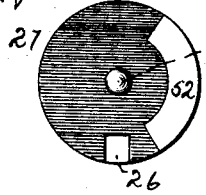
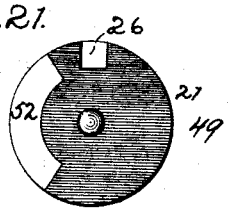
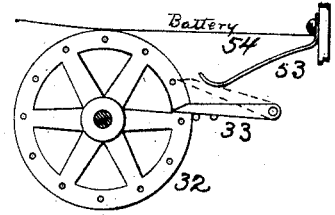
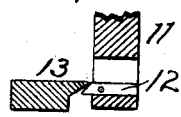
WITNESSES:
Charles W. Marvin.
Rosanor Smith
INVENTOR
James H. Garratt.
BY
Smith & Denison
ATTORNEYS.

UNITED STATES PATENT OFFICE.

JAMES H. GARRATT, OF GROTON, NEW YORK.

WORKMAN'S TIME-RECORDER.

SPECIFICATION forming part of Letters Patent No. 620,906, dated March 14, 1899.

Application filed December 23, 1897. Serial No. 663,187. (No model.)

*To all whom it may concern:*

Be it known that I, JAMES H. GARRATT, of Groton, in the county of Tompkins, in the State of New York, have invented new and useful Improvements in Workmen's Time-Recorders, of which the following, taken in connection with the accompanying drawings, is a full, clear, and exact description.

My invention relates to workmen's time-recorders for recording their time and at the same time mechanically computing the amount of money due each workman at the end of a week or at any intermediate time, the rate per hour being established.

My object is to provide a time-recorder to record the time only of a workman or to both record the time and compute his wages at a predetermined rate per hour, the mechanism being operated either directly by utilizing a clock-movement as a driving and time-keeping mechanism and also to operate a releasing-escapement at predetermined intervals to start the revolution of a time-keeping and wage-computing wheel, at the same time locking the workman's key in the tumbler, and operating another escapement at intervals to release said key and stop the revolution of said wheel. This apparatus can be operated either directly by the insertion of the key or at a distance from the recording devices by means of electromagnets, wiring, the making and breaking of a circuit by each escapement, and by each key when inserted into a tumbler wherever located, as in an upper story of a factory, the recording devices being in the office on the ground floor or even in a detached building.

My invention consists in the several mechanisms conducing to produce the general results and in the several combinations of elements appertaining thereto, as hereinafter described, and which are specifically set forth in the claims hereunto annexed. It is constructed as follows, reference being had to the accompanying drawings, in which—

Figure 2:
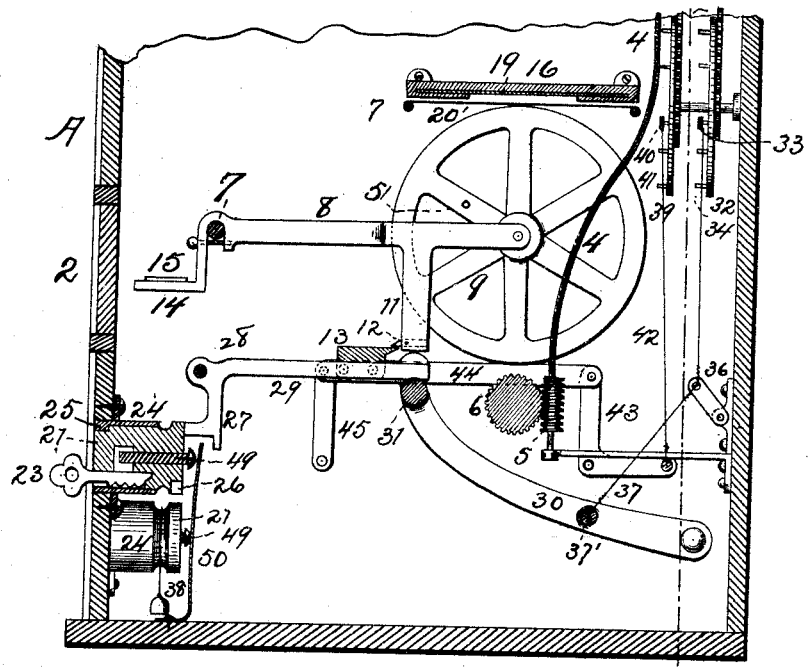
Figure 3:
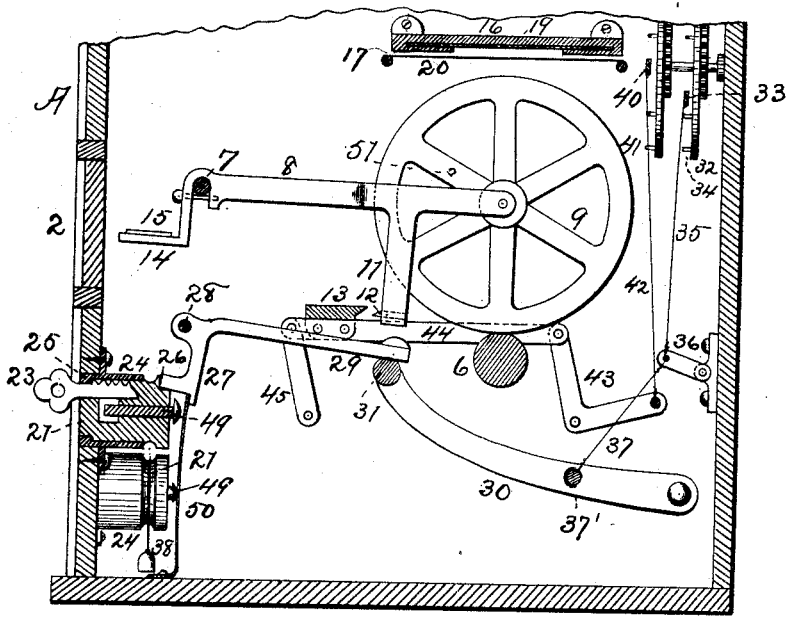

Figure 1 is a front elevation of the case, clock, door opening the interior, and the key-tumblers, part of which are shown as ready to be operated, the others having been operated and holding the workman's designating-key. Fig. 2 is a vertical section on a line diametrical to one of said tumblers, showing the key inserted ready to be turned and the recording-wheel stationary, the clock being omitted. Fig. 3 is a like view of the same, showing the key turned and locked and the recording-wheel lowered by the escapement into position to be revolved. Fig. 4 is a vertical section on line $x\,x$, Fig. 2, showing the universal roller in and the recording-wheels in elevation and one of said wheels lowered onto said roller to be revolved by it. Fig. 5 is a sectional detail of the universal roller, recording-wheel, its mounting, and the printing mechanism. Fig. 6 is a top plan of Fig. 5, showing the card-case, computation or pay-roll card, and ink-ribbon, parts being broken away. Fig. 7 is a front elevation of a tumbler ready for the insertion of a workman's key. Fig. 8 is a like view of the same partially rotated, as by a workman, and in the locked position, the key being omitted. Fig. 9 is a cross-section of Fig. 8, showing the plunger in its normal position and the foreman's key engaging therewith. Fig. 10 is a like view of the same, showing the plunger turned in the tumbler. Fig. 11 is a section of Fig. 9 on line $y\,y$, showing the tumbler-pin in its normal position. Fig. 12 is a like view of Fig. 10 on line $y'\,y'$, showing the plunger shoved in after turning and the tumbler-releasing pin projected. Fig. 13 is an elevation of the primary escapement and the lever actuated by it. Fig. 14 is a like view of the secondary escapement and the lever actuated by it. Fig. 15 is a longitudinal section of the pay-roll-card holder, the card, and ribbon. Fig. 16 is a plan view of a pay-roll card, showing the workman's numerals, the rate per hour of each workman, and his wages computed. Fig. 17 is a plan view of part of a wage-computing strip around a recording-wheel at the rate of twenty cents per hour. Fig. 18 is a sectional detail illustrating an electromagnetic arrangement for controlling or regulating the mechanisms. Fig. 19 is a sectional detail of the electrical connections to the tumbler and tumbler locking and releasing mechanisms. Figs. 20 and 21 are end elevations of the inner end of a tumbler, showing the contact-plates in different positions before and after its rotation. Fig. 22 is a detail of an escapement, the lever actuated thereby, and the spring contact-finger with which a circuit is made each time the lever is raised. Fig. 23 is a sectional detail of the latch for supporting the record-wheel, showing it unlatched. Fig. 24 is a like view of the same, showing it latched.

A is a suitable casing provided with a door 2, and 3 is a suitable clock-movement to keep the time and to drive a shaft 4, (here shown as flexible,) which drives a worm or other gear 5 and rotates the universal roller 6, extending across the casing and suitably mounted or journaled. A rod 7 is suitably mounted in the casing parallel to said roller, and upon it a series of rockers 8 are mounted, hung, or pivoted to swing freely, their rear ends being bifurcated, and a record-wheel 9 is suitably mounted to revolve freely in each fork. Each of these wheels comprises a suitable hub, a suitable rim or felly suitably connected thereto, and a computation or pay-roll strip 10, as an electrotype, around said rim and removably connected thereto. As here shown, Fig. 17, it shows computation on the basis of twenty cents per hour.

Each rocker 8 is provided with a leg 11, and 12 is a latch or dog suitably mounted in or upon said leg and normally engaging with the upper face of the supporting bar or latch 13, which extends across nearly the entire length of the case and normally supports all of said record-wheels away from the universal roller. This roller 6 revolves continuously, and, as here shown, makes one complete revolution every twenty-four hours, and its ratio to each record-wheel is such that said wheel makes a full revolution every six days or every sixty hours—a week's working time—and the computation-strip, of course, is constructed accordingly with computations for sixty hours at the specified rate. Each rocker is also provided upon its front end with an arm or extension 14, having a suitable plate 15, upon which a numeral is suitably secured or inscribed, which designates a workman, so that by opening the door it can be seen and manipulated, as hereinafter described.

A suitable plate 16 is suitably secured across the casing, provided with suitable flanges 17, creating grooves which receive through a slot 18 in the case a pay-roll card 19, which is previously provided with a row $a$ of workmen's numerals, with a row $b$ of rates of wages per hour, and with a series of transverse spaces, one for each numeral and rate, in which the imprint is made from the record-wheel by pressing down upon the arm 14, which throws the wheel up against the ink-ribbon 20 and said card. Thus the spaces $c$, $d$, $f$, $g$, $h$, $i$, $k$, $n$, $o$, $p$, $r$, $s$, and $t$ each show the computation of sixty hours work at the rate specified for each, the space $e$ fifty-two hours at that rate, the space $j$ forty-five hours at that rate, and the space $m$ by the bar appearing between the figures fifty-nine and a half hours at that rate.

In the front of the case a series of tumblers 21 are suitably mounted to be rotated, each having a keyhole 22 to receive a suitable key 23 and be rotated by it. This tumbler is here shown as inserted from within into a sleeve 24 and having its outer end rabbeted to receive the inwardly-projecting flange 25, and the keyhole is cut partly in said flange. Each tumbler is provided on its inner end with a notch 26, Figs. 20 and 21, and when the tumbler is rotated a half-revolution the locking-pawl 27 enters said notch, as hereinafter described, and locks the tumbler against rotation in either direction, and this locks the key in the tumbler, as seen in Fig. 3. This pawl is pivoted upon a rod 28 across the case, there being one pawl for each tumbler and a tumbler for each record-wheel, and each pawl is provided with a rearward arm 29, which is carried and vertically vibrated by a vibratory frame composed of arms 30, pivoted upon the casing, and a universal cross-bar 31, connecting them, being nearly the length of the case. When raised in the position shown in Fig. 2, with the tumbler ready to receive the key, said pawl bears against the inner end of the tumbler and the pawl-arm engages with the leg of the rocker to hold the record-wheel out of contact with the universal roller. When said universal bar 31 is lowered, as in Fig. 3, said pawl-arm drops or is free to drop, so that the pawl can lock the tumbler when the tumbler is rotated, then allow the record-wheel to drop (when unlatched) into engagement with and to be frictionally or otherwise revolved by said universal roller—that is to say, said wheel drops if released from the universal latch-bar support 13 also, but not otherwise. Neither will any tumbler or key therein be locked until the pawl is released to rock upon the rod 28. This pawl is released by an escapement at predetermined intervals or at fixed periods of time, comprising an escapement-wheel 32, suitably connected to, actuated by, and synchronous with a clock, hereinafter called the "primary escapement," a lever 33 successively engaged by the pins 34 on said wheel and pivoted upon the casing or a cross-bar therein, a cord 35 connecting said lever to a vibratory bar 36, and a cord 37, connecting said bar to a rod 37', connecting the end arms 30, which carry the universal-bar support 31. Ordinarily this escapement is arranged to operate at 6.45 a. m. to drop said universal support, which releases the pawls to lock each tumbler as it is rotated by the workman entering the factory, locking each key in; but no pawl can drop until the tumbler is rotated to bring the notch into proper position to receive the pawl. At twelve o'clock noon said escapement raises said universal bar, swings said pawls, and unlocks all of the said tumblers, so that each workman can turn said tumbler back, aided perhaps by the cord and weight 38, which is wound up onto said tumbler when it is first operated at the time of the insertion of the key. At 12.45 p. m. it again operates to lower the universal bar and release the pawls to lock the tumblers, and at six p. m. it again releases or unlocks the tumblers for their backward rotation and the removal of the keys.

Until a tumbler is rotated after the insertion of a key the point of the pawl will bear against its inner end and be maintained in its normal position even though the universal bar 31 be down. A secondary escapement is also provided, comprising an escapement-wheel 39, suitably connected to and driven by the clock-movement and synchronous therewith, a lever 40, engaging intermittently with the pins 41 on said wheel, and a cord 42, connecting said lever to the bell-crank 43, to which the reciprocating bar 44 is connected, the front end of which is carried by the link 45, which bar carries the universal latch-bar 13 for the record-wheels by the engagement of their latches therewith. This escapement operates first at seven a. m. to shift said universal latch-bar forward, thus, in fact, releasing all of said record-wheels; but only those can drop onto the universal roller which are complementary to the pawl-arms of the pawls which have been operated to lock the then-rotated tumblers. These record-wheels are then revolved frictionally by said roller until the primary escapement raises the universal bar 31 to lift the pawl-arms 29 and unlock the tumblers, and by this movement said pawl-arms engage with the rocker-legs 11 and raise the record-wheels back to their normal latched positions out of engagement with said roller, they having been then revolved continuously from seven a. m. until noon and then showing five hours' wages earned. The pins on the secondary escapement-wheel are ordinarily arranged so that at, say, five minutes after said universal latch-bar has released said record-wheels to drop said latch-bar will be shifted back under said latches to support said wheels which have not dropped or have been raised until again released. Thus if they are first released at seven a. m. they can be locked at 7.05 and again released at 7.30 a. m. and at like intervals until noon, when they are all raised and relatched and the tumblers all unlocked simultaneously by the operation of both escapements at that time. Then at one p. m. this secondary escapement again releases the record-wheels then indicated by the then-locked tumblers, and at like intervals in the afternoon, as in the forenoon, said secondary escapement drops such additional wheels as may be represented by locked tumblers, and at six p. m., as at noon, all of said tumblers are unlocked, and all of the record-wheels are raised out of engagement with the universal roller, each then indicating the wages earned by the workman represented by it. This amount is shown at the printing-point directly under the ink-ribbon.

At the end of the week the foreman or book-keeper opens the door and manually operates each rocker to throw its wheel up against the ink-ribbon and imprint the amount earned, as shown by the wheel, onto the pay-roll card, which is then removed, the men paid according to its record, and filed away for future reference.

In case at any time during the week a workman wants his pay, the foreman opens the door and operates the proper rocker to make its imprint upon the card, which is removed to ascertain the amount and reinserted.

In case at any time in a day a workman wishes to leave, the foreman opens the door and manually relatches the proper record-wheel, raises the proper pawl-arm to hold it up if the latch-bar is then forward, unlocking the proper tumbler for backward rotation manually or by the cord and weight, and the workman removes his key; or this can be done mechanically except imprinting the record, as follows: A suitable key-arbor 46 is mounted to be rotated and reciprocated in said tumbler, slotted to receive a key 47, and provided with an arm 48 in a recess within the tumbler, so that when rotated after the insertion of the key said arm will be brought into position to engage with the end of a pin 49 to push it in against a spring 50, which engages with the heel of the tumbler-locking pawl and unlocks the tumbler, at the same time lifting the record-wheel, and when the tumbler is rotated backward the key can be removed.

At all times whenever a record-wheel is out of engagement with the universal roller it stands still.

At the close of the week, after the record is printed, the record-wheels are manually rotated so as to bring the starting-point under the printing-line, such position being determined as by a pin 51 on the rim or spoke of the wheel, which is brought into contact with the rocker, as in Fig. 2 or Fig. 3, for starting and which after sixty hours' rotation of the wheel is brought into engagement with the lower side of said rocker or its leg.

In Figs. 18 and 19 I show an application of electricity to the recorder, by which the principal mechanisms are electrically actuated, as by the making and breaking of electrical circuits.

In Figs. 20 and 21 the tumbler is shown as provided with a contact-plate 52.

In Fig. 22 the primary scape-wheel is shown as actuating the lever to make a contact with and a circuit through a spring-finger 53, which is connected by a wire 54 to one pole of a battery (not shown) by the wire 55 to one pole of the electromagnet 56, the other pole of which is connected by the wire 57 to the battery, and the armature 58 of this electromagnet is suitably connected by the arm 59 and link 60 to the tumbler-locking pawl 61, whereby said pawl is electrically retracted to release the tumbler when a circuit is made and said universal support is raised by the making of said circuit, and when said circuit is broken said pawl is released, as at 6:45 a. m., as above described, to unlock a tumbler, and said universal support is dropped and the record-wheels left supported by said latch-bar ready to be dropped when it is shifted by the secondary scape-wheel, as at seven a. m., as above described. In its normal position the point of the pawl is out of contact; but when the tumbler is turned and said pawl makes contact with the plate 52 a circuit is made through the pawl and the wire 63 to one pole of said battery, its other pole being connected by the wire 64 to one pole of the electromagnet 65, the other pole of which is connected by the wire 66 to said tumbler and its contact-plate. The armature 67 by the spring 68 normally holds the angular lever 69 to support the record-wheel above the universal roller; but when said circuit is made this armature releases this lever to swing upon its pivot and release said roller-wheel to drop, if it has been unlatched, or leave it ready to drop when unlatched, onto the universal roller. The stud or pin 70 upon this armature serves as an abutment for the lever 69. When by the rotation of the tumbler the pawl-point leaves the contact-plate, the circuit is broken and the magnet 65 is dead, and thereafter the pawl enters the notch in the tumbler and locks it.

In case a workman wishes to leave before quitting-time the foreman inserts his key into the key-arbor 46 in the proper tumbler, turns it, and pushes back the insulated pin 49 against the spring, which spring makes contact and circuit with the pawl 61 and wire 63 to the battery, and by means of the wire 71, connecting said spring to one pole of the electromagnet 72 and the wire 73 from the battery to the other pole of this magnet a circuit is made, as shown, to actuate the armature 74 to raise the arm of the lever 69 into position to engage with the stud 70 on the armature 67, and thus raise and support that particular roller-wheel clear from the universal roller. The secondary escapement operates the same as before to reciprocate or shift the latch-bar.

It will be seen that Figs. 18 and 19 can be comprised in one instrument or that they can be separated, as shown, Fig. 18 being placed in the office and Fig. 19 or as many duplicates thereof can be placed in a room or rooms of a factory and suitably connected by wiring to the record-making mechanisms, so that each workman can register in the room where he works, thus saving the time for the employer which is occupied by the workman in going from the machine after registry to his room or floor of the building. This separated mechanism can also be utilized for a watchman's recorder, the tumblers being located in different parts of a factory and making their records in the office, varying the escapements as may be desired.

Having described my invention, what I claim, and desire to secure by Letters Patent, is—

1. In a workman's time-recorder, a rotating workman-designating tumbler and a tumbler-locking pawl, in combination with a clock-movement, an escapement operated thereby and means to connect it to said pawl, whereby said tumbler is released from said pawl at stated predetermined intervals of time.

2. In a workman's time-recorder, a rotating workman-designating tumbler adapted to be rotated and locked after partial rotation, combined with a cord and weight connected to said tumbler whereby it is rotated back to its normal position when unlocked.

3. In a workman's time-recorder, the combination with a key-rotated workman-designating tumbler and a pawl engaging therewith to lock it when partially rotated, of a rotating key-arbor in said tumbler, an arm thereon, and a reciprocating pin with which said arm engages when said key-arbor is partially rotated, and whereby said pin engages with said pawl to unlock said tumbler.

4. In workman's time-recorder, the combination with a key-rotated workman-designating tumbler and a pawl engaging therewith to lock it, when partially rotated, of a rotating key-arbor in said tumbler, an arm thereon, a reciprocating pin in said tumbler and a spring, whereby when said arbor is rotated and pushed in said pin engages with said spring and said spring with said pawl to unlock it, and returns said pin and arbor to their normal position.

5. In a workman's time-recorder, the combination with a key-rotated workman-designating tumbler, and a pawl engaging with said tumbler, of a workman's record-wheel carried by said pawl, and releasing it to fall when said tumbler is rotated into position for said pawl to swing and engage with a notch in said tumbler to lock it.

6. In a workman's time-recorder, the combination with a clock-movement, an escapement actuated thereby, and a universal bar connected to and oscillated vertically by said escapement at predetermined intervals, of a rotating workman-designating tumbler, a pawl engaging with it and normally supported by said universal bar, and adapted to swing and lock said rotated tumbler when said universal bar is lowered, and to unlock it when said bar is raised.

7. In a workman's time-recorder, the combination with a clock-movement, an escapement actuated thereby, and a universal bar connected to and vertically oscillated at fixed intervals by said escapement, of a workman's record-wheel normally supported by said bar, and a universal roller onto which said record-wheel drops to be revolved when said universal bar is lowered.

8. In a workman's time-recorder, the combination with a time-actuated escapement, and a universal bar connected thereto, of a series of workman's record-wheels normally supported by said bar, and a universal roller by which said record-wheels are revolved when released to engage therewith by the lowering of said universal bar.

9. In a workman's time-recorder, the combination with a time-actuated escapement and a universal latch-bar, of a series of workman's record-wheels normally supported by said bar, and a universal roller by which said record-wheels are revolved when released to fall onto it by the shifting of said latch-bar induced by said escapement.

10. In a workman's time-recorder, the combination with a series of workman's record-wheels, of a universal latch-bar, normally supporting them, and means to shift said bar to permit them to fall to be revolved while lowered.

11. In a workman's time-recorder, the combination with a series of workman's record-wheels, of a series of rotating key-actuated workman's designating-tumblers, pawls adapted to lock them respectively when rotated, of an oscillating universal bar normally supporting said pawls out of their unlocked position and supporting said record-wheels, and a universal roller onto which said record-wheels drop to be revolved when said universal bar is lowered.

12. In a workman's time-recorder, the combination with a rotating tumbler, of a pawl having its point bearing against the tumbler, and a record-wheel carried by said pawl, and adapted to drop when said tumbler is rotated and said pawl swings to lock the rotated tumbler.

13. In a workman's time-recorder, the combination with a rotating tumbler, a pawl normally bearing against its inner end, a record-wheel normally carried by said pawl, and released to drop when said tumbler is rotated and said pawl locks it, and means to revolve said wheel when lowered.

14. In a workman's time-recorder, the combination with a record-wheel, of a continuously-revolving roller adapted to revolve said wheel when engaged therewith, and means to make and break such engagement at will.

15. In a workman's time-recorder, the combination with a record-wheel, a continuously-revolving roller, a rocking pawl normally supporting said wheel out of engagement with said roller, and a rotating tumbler normally supporting said pawl whereby when said tumbler is rotated said pawl swings and locks it, and lowers said wheel onto said roller, of a lever in the rear of said tumbler, and a pin in said tumbler, and means to push said pin inwardly against said lever whereby said tumbler is unlocked and said wheel raised and its revolution stopped.

16. In a workman's time-recorder, a casing, and a rod across it, in combination with an oscillating rocker mounted upon said rod, a record-wheel journaled in or upon the free end thereof, a finger-key thereon whereby said rocker is manually oscillated to raise or lower said wheel, and an ink-ribbon which said wheel strikes when so raised.

17. In a workman's time-recorder, the combination with a casing, a rod across it, a rocker mounted upon said rod, a record-wheel carried by the free end of said rocker, an ink-ribbon above said wheel and a continuously-revolving roller below it, of a mechanism supporting said wheel between them and out of contact with both of them.

18. In a workman's time-recorder, the combination with an oscillating rocker, and a record-wheel thereon, of a time-indicating escapement, a bell-crank actuated thereby, a bar reciprocated by said bell-crank, and a latch-bar normally supporting said wheel and rocker, and releasing them when said bar is reciprocated.

19. In a workman's time-recorder, the combination with an oscillating rocker, a record-wheel thereon, and a latch upon said rocker, of a time-indicating escapement, a bell-crank actuated thereby, a bar reciprocated by said bell-crank and a latch-bar with which said latch engages to support said rocker and wheel, and releasing them when said bar is reciprocated.

20. In a workman's time-recorder, the combination with an oscillating rocker, a record-wheel thereon, a reciprocatory latch-bar normally supporting them, and a continuously-revolving roller below said wheel, of an escapement operative to actuate said latch-bar and release said wheel to engage with said roller at a predetermined time.

21. In a workman's time-recorder, the combination with a record-wheel, vertically movable, of a pawl and a latch normally supporting it, and means to remove either support separately, leaving said wheel, supported by the other.

22. In a workman's time-recorder, the combination with a record-wheel, vertically movable, of two independent supports normally jointly supporting it, of a universal roller, and means to remove either support separately, leaving said wheel supported by the other whereby said wheel will be released to engage with said roller when the other support is removed.

In witness whereof I have hereunto set my hand this 13th day of December, 1897.

JAMES H. GARRATT.

In presence of—
EDWIN E. BARNEY,
FRANK J. TANNER.